United States Patent [19]
LeVey

[11] Patent Number: 6,152,667
[45] Date of Patent: Nov. 28, 2000

[54] BLIND APERTURE FASTENER

[75] Inventor: Ken LeVey, West Chicago, Ill.

[73] Assignee: Illinois Tool Works Inc., Glenview, Ill.

[21] Appl. No.: 09/412,277

[22] Filed: Oct. 5, 1999

[51] Int. Cl.$^7$ .............................. F16B 21/18; F16B 13/06
[52] U.S. Cl. ........................... 411/521; 411/61; 411/339; 411/508
[58] Field of Search .............................. 411/61, 74, 338, 411/339, 508, 509, 510, 521

[56] References Cited

U.S. PATENT DOCUMENTS

| | | | |
|---|---|---|---|
| 942,693 | 12/1909 | Wintermute | 411/74 X |
| 2,596,952 | 5/1952 | Crowther . | |
| 3,287,040 | 11/1966 | Verticchio . | |
| 3,999,356 | 12/1976 | Packman | 411/61 X |
| 4,203,193 | 5/1980 | Arthur | 411/61 X |
| 4,233,881 | 11/1980 | Carrier . | |
| 4,254,543 | 3/1981 | Blonski . | |
| 4,407,619 | 10/1983 | Siebol . | |
| 4,610,519 | 9/1986 | Hyman . | |
| 4,706,367 | 11/1987 | Garringer . | |
| 5,018,919 | 5/1991 | Stephan . | |
| 5,314,278 | 5/1994 | Weber . | |
| 5,517,878 | 5/1996 | Klein et al. . | |
| 5,645,383 | 7/1997 | Williams . | |
| 5,927,920 | 7/1999 | Swanstrom | 411/61 X |

*Primary Examiner*—Neill Wilson
*Attorney, Agent, or Firm*—Pitney, Hardin, Kipp & Szuch LLP

[57] ABSTRACT

The fastener includes a stud with a post element, a cylindrical inner sleeve with inwardly extending half-hemispherical bosses immediately adjacent to outwardly extending half-hemispherical bosses, and a base element with a blind aperture. The inner sleeve is received within the blind aperture and the post element is received within the inner sleeve. The pressure exerted upon the insertion of the post element of the stud and the structure of the bosses cause the inner sleeve to cock into a locked position. The exposed edges of the inwardly extending half-hemispherical bosses of the inner sleeve engage the post element while the exposed edges of the outwardly extending half-hemispherical bosses of the inner sleeve engage the walls of the blind aperture in order to resist the subsequent withdrawal of the post element from the blind aperture.

14 Claims, 4 Drawing Sheets

BLIND APERTURE FASTENER

BACKGROUND OF THE INVENTION

1. Field of the Invention

This invention pertains to a fastener with a stud, an inner sleeve and a base member. The stud includes a post which fits into a blind aperture in the base member. The sleeve fits between the post and the base member and includes a boss structure which locks the post into the base member.

2. Description of the Prior Art

In the prior art, fasteners with a post which inserts into a blind aperture within the base member are known. However, to insure a tight fit between the post and the base member, relatively accurate manufacturing tolerances were required. Similarly, these fasteners frequently had intricate or complex shapes which had to be manufactured precisely. Additionally, many of these fasteners require complicated installation procedures, such as twisting, or specialized installation tools. All of these factors can add to the final total cost of such a fastener.

OBJECTS AND SUMMARY OF THE INVENTION

It is therefore an object of this invention to provide a fastener which has relatively relaxed manufacturing tolerances.

It is therefore a further object of this invention to provide a fastener which has a reduced complexity of structure.

It is therefore a still further object of this invention to provide a fastener which has a simple installation process.

It is therefore a final object of this invention to provide a fastener which reduces or eliminates the need for specialized tools in the installation process.

These and other objects are attained by providing a fastener with a base element including a blind aperture, a stud with a post element which fits into the blind aperture, and an inner sleeve which fits between the walls of the blind aperture and the post element. The inner sleeve includes inwardly and outwardly extending protrusions which function as boss elements against the post and base element, respectively. These protrusions ride smoothly on the walls of the blind aperture of the base element upon insertion of the post element into the blind aperture. Stamping of the stud into the aperture causes the protrusions to "cock" into a locked position. Additionally, the inner sleeve includes a longitudinally oriented slot in order to allow the sleeve to accommodate somewhat varying sizes of the blind aperture and post.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
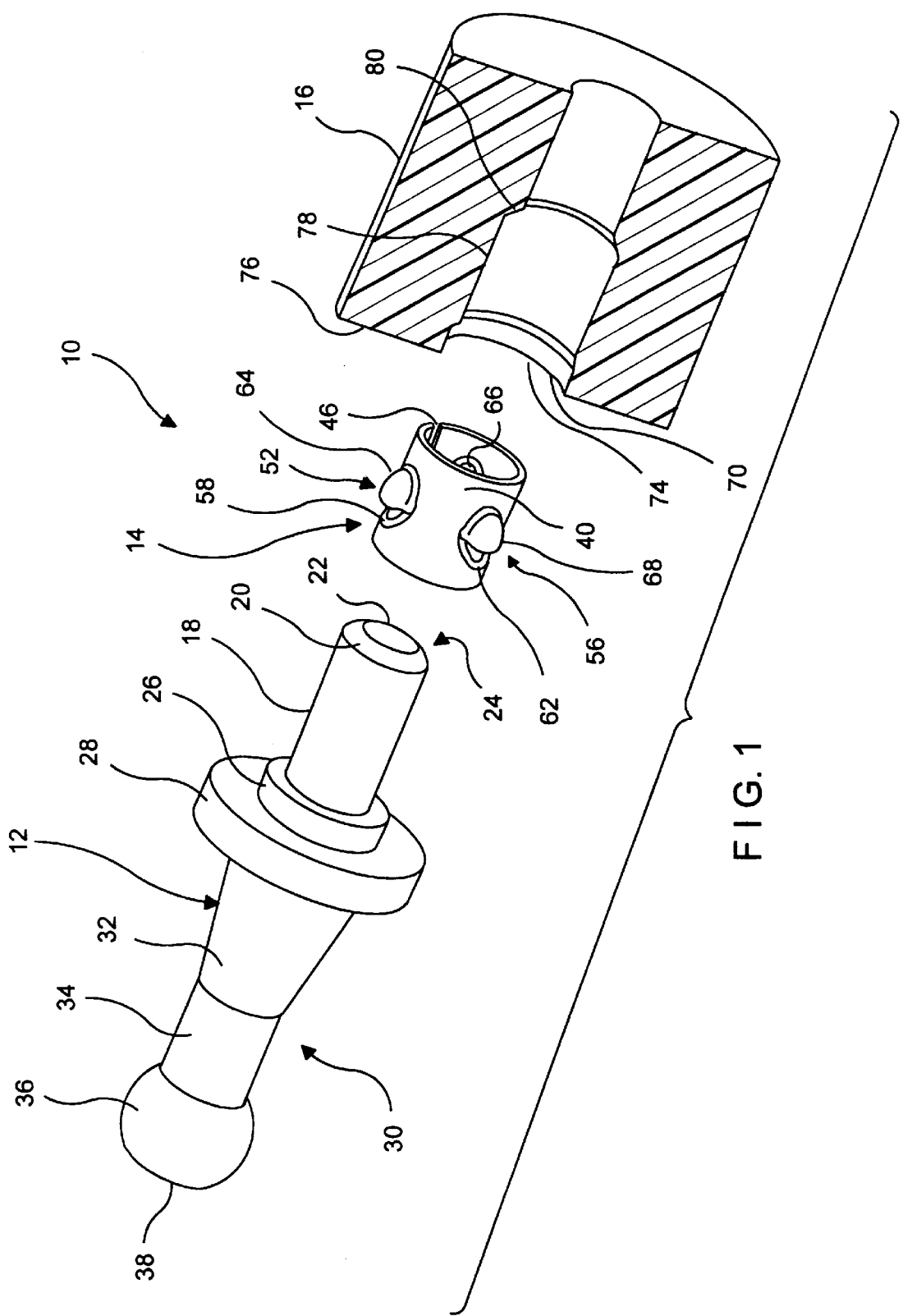
FIG. 1 is an exploded partially cut-away perspective view of the fastener of the present invention.
Figure 2:
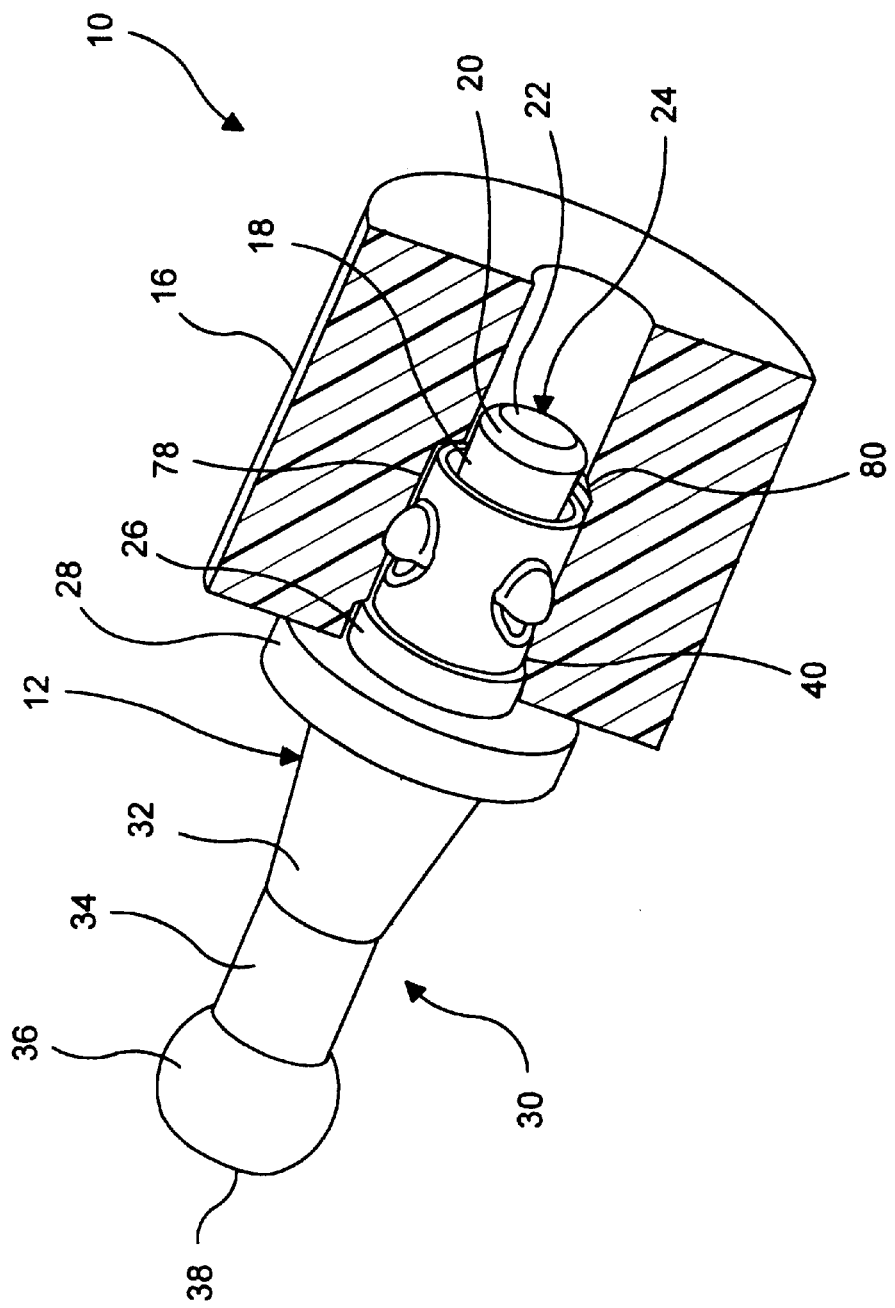
FIG. 2 is a partially cut-away perspective view of the fastener of the present invention in the engaged position.
Figure 3:
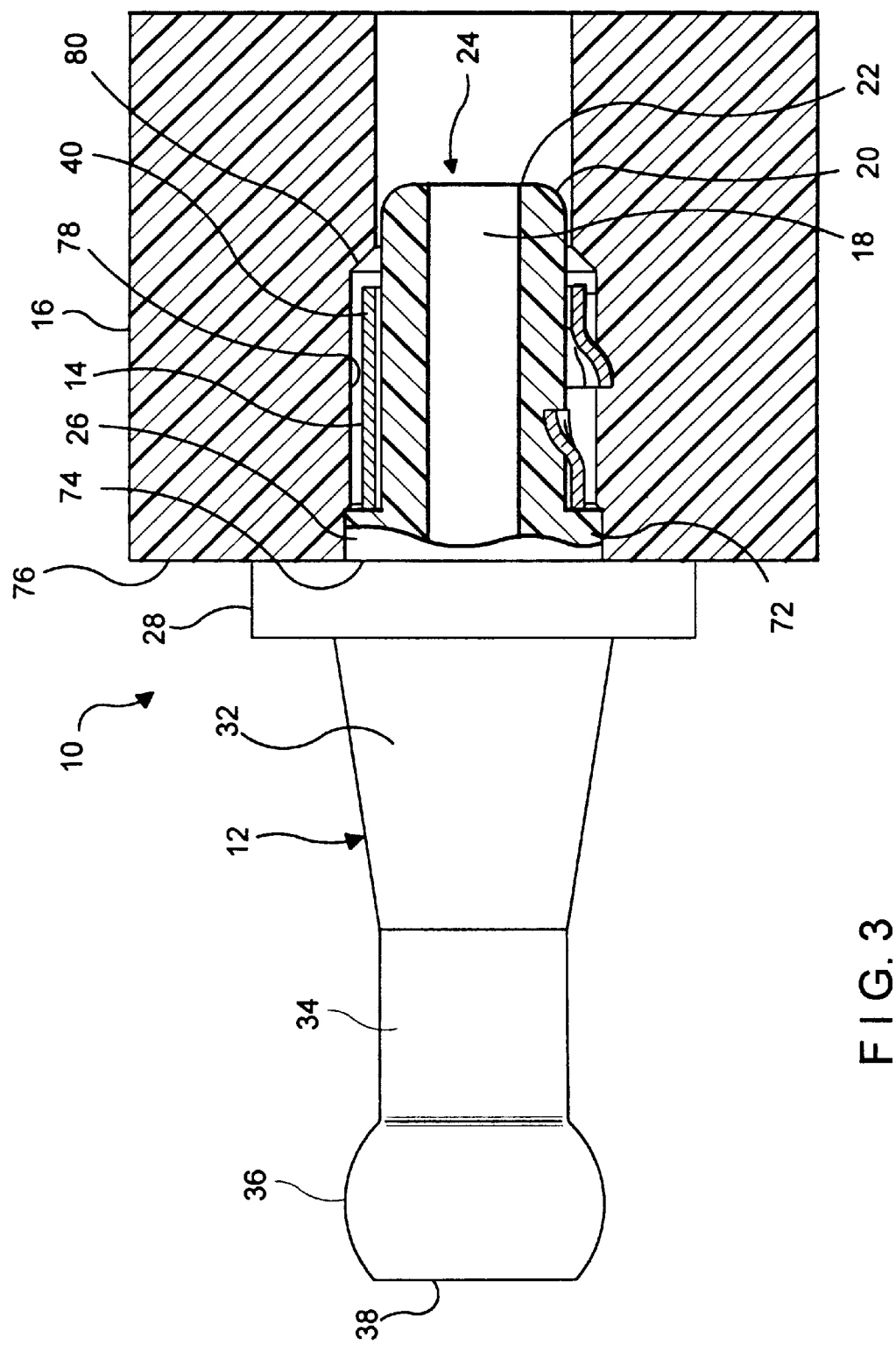
FIG. 3 is a cross-sectional view of the fastener of the present invention in the engaged position.

Referring now to the drawings in detail wherein like numerals indicate like elements throughout the several views, one sees from FIGS. 1, 2 and 3 that fastener 10 includes stud 12, inner sleeve 14 and base element 16.

Stud 12 is radially symmetric and includes cylindrical post element 18 with chamfer 20 on tip 22 on distal end 24. Proximal end of cylindrical post element 18 includes enlarged stabilizing ring 26 (optional, as described hereinafter). Cylindrical base 28 is formed adjacent to stabilizing ring 26. Gripping element 30 is formed adjacent to cylindrical base 28 and, in the illustrated embodiment, consecutively includes frusto-conical portion 32, cylindrical portion 34 and partially hemispherical head 36 with outer planar surface 38.

Stud 12 is typically formed of glass-filled plastic, but those skilled in the art will recognize that other materials may be used. Stud 12 is typically molded as a single integral piece.

Figure 4:
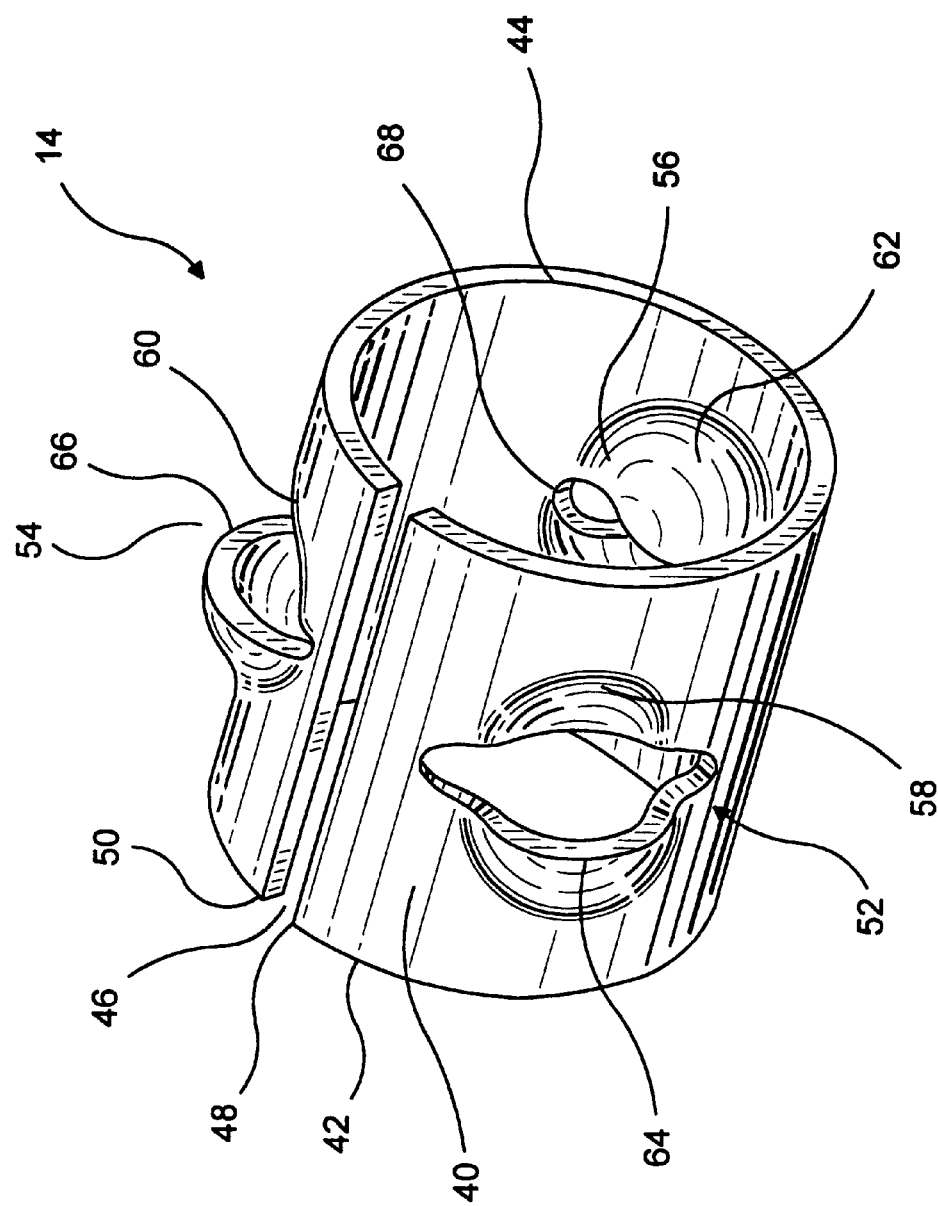
FIG. 4 is a perspective view of the inner sleeve of the fastener of the present invention.

Inner sleeve 14 is typically formed from sheet metal or a similar material. As shown in FIG. 4, the sheet metal forms roughly cylindrical walls 40 with open ends 42, 44. However, longitudinal slot or gap 46 is formed between ends 48, 50 of the sheet metal. Longitudinal slot or gap 46 allows for flexure of cylindrical walls 40 during installation.

Boss structures 52, 54, 56 are formed about the periphery of cylindrical walls 40. Boss structures 52, 54, 56 include inwardly extending half-hemispherical bosses 58, 60, 62, respectively, which are formed immediately adjacent to outwardly extending half-hemispherical bosses 64, 66, 68, respectively. As can be seen from FIG. 4, in boss structure 52, outwardly extending half-hemispherical boss 64 shares substantially the same geometric center as inwardly extending half-hemispherical boss 58. Additionally, the exposed edge of outwardly extending half-hemispherical boss 64 is formed from a common original seam in inner sleeve 14 as the exposed edge of inwardly extending half-hemispherical boss 58. Boss structures 54, 56 are similarly formed. The shape and immediately adjacent structure of the inwardly extending half-hemispherical bosses 58, 60, 62 with the outwardly extending half-hemispherical bosses 64, 66, 68 allow for the formation of a sharp exposed edge on the bosses 58–68 with a simple sheet metal stamping process. Additionally, this structure allows the bosses 58–68 to maintain their shape under load and to be pushed into blind aperture 70 with the lowest possible friction and ease of manufacturing. However, a variety of shaped dimples would be possible such as a dimple with a radius equal to or less than the inner diameter radius of blind aperture 70, an oval, a triangle, a cone, a square, a rectangle or any other shape which would present an edge to grab the plastic when opposing force is applied. It is further important that the dimples do not inelastically or otherwise permanently deform the inner diameter of blind aperture 70 in such a way that the boss edges no longer have the ability of interfering with the inner diameter of blind aperture 70.

Base element 16 is typically formed of plastic or a similar material. Base element 16 is roughly cylindrical with blind aperture 70 formed about the longitudinal axis thereof. Blind aperture 70 includes enlarged portion 72 which forms mouth 74 in planar surface 76. Enlarged portion 72 has a diameter to accommodate stabilizing ring 26. This gives fastener 10 additional stability against lateral forces. Central portion 78 of blind aperture 70 is formed adjacent to enlarged portion 72 and is sized to allow inner sleeve 14 to fit therein and to be engaged by inner sleeve 14 when cylindrical post element 18 is inserted into inner sleeve 14. While stabilizing ring 26 and enlarged portion 76 are illustrated in the drawings and described herein, these elements should be considered optional in that it may be at least equally preferred to omit these elements. Cylindrical chamfered stop section 80 is formed adjacent to central portion 78 and serves to limit the insertion of inner sleeve 14 into blind aperture 70. Cylindrical chamfered stop section 80 leads to blind aperture portion 82 which has a diameter to receive cylindrical post element 18.

To use fastener 10, the installer typically inserts inner sleeve 14 into central portion 78 of blind aperture 70 as limited by cylindrical chamfered stop section 80 and aligns blind aperture 70 with the first side of an aperture in a panel or panels to be fastened (not shown). The user then pushes cylindrical post element 18 through the second side of the aperture in the panel or panels to be fastened (not shown) and into cylindrical sleeve 14 which is positioned within blind aperture 70. Stud 12 can then be stamped into position thereby driving post element 18 so that edges of inwardly extending half-hemispherical bosses 58, 60, 62 engage post element 18 and outwardly extending half-hemispherical bosses 64, 66, 68 engage the walls of blind aperture 70. The pressure exerted upon the insertion of stud 12 and the stamping into blind aperture 70 cause the inner diameter and the outer diameter of inner sleeve 14, along with inwardly extending half-hemispherical bosses 58, 60, 62 and outwardly extending half-hemispherical bosses 64, 66, 68, cause inner sleeve 14 to "cock" into position. Any subsequent forces attempting to withdraw stud 12 from base element 16 are opposed by the engagement of bosses 58–68 as described above. The final locked position of fastener 10 typically has planar surface 76 flush with a first side of the panel or panels to be fastened and cylindrical base 28 of stud 12 flush with a second side of the panel or panels to be fastened. The order of steps above is meant to be illustrative and those skilled in the art could have occasion to use a different order of steps of installation.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A fastener including:
   a stud with a post;
   a base with an aperture formed by inner walls therein;
   a sleeve including a cylindrical wall and open ends, said cylindrical wall having an inner diameter and an outer diameter, said sleeve further including a plurality of inwardly extending bosses formed from half hemispheres and an equal plurality of outwardly extending bosses formed from half hemispheres formed on said cylindrical wall each of said inwardly extending bosses being immediately adjacent to a respective outwardly extending boss;
   said outer diameter and said outwardly extending bosses being sized so that said sleeve can be inserted into said aperture, and said inner diameter and said inwardly extending bosses being sized so that said post can be inserted into said sleeve whereby said outwardly extending bosses said inner walls and said inwardly extending bosses engage said post.

2. The fastener of claim 1 wherein each of said plurality of inwardly extending bosses shares a geometric center with a respective one of said plurality of outwardly extending bosses.

3. The fastener of claim 2 wherein each of said plurality of inwardly extending bosses presents a first edge and each of said plurality of outwardly extending bosses presents a second edge, wherein each of said first edges is formed from a common seam on said cylindrical wall with a respective one of said second edges.

4. The fastener of claim 3 wherein said cylindrical wall of said sleeve includes a longitudinally oriented gap.

5. The fastener of claim 4 wherein said sleeve is formed from sheet metal and said plurality of inwardly extending bosses and said plurality of outwardly extending bosses are stamped onto said sleeve.

6. The fastener of claim 5 wherein said blind aperture includes a stop to limit insertion of said sleeve therein.

7. The fastener of claim 6 wherein said stop is a cylindrical chamfered section leading to a portion of reduced diameter.

8. The fastener of claim 7 wherein said portion of reduced diameter has a diameter to receive said post.

9. The fastener of claim 8 further including a ring adjacent to said post, said ring being of greater diameter than said post, said aperture including a mouth with a diameter to receive said ring.

10. A fastener including:
    a stud with a post;
    a base with an aperture formed by inner walls therein;
    a sleeve including a cylindrical wall and open ends, said cylindrical wall having an inner diameter and an outer diameter, said sleeve further including at least one inwardly extending boss and at least one outwardly extending boss formed on said cylindrical wall;
    at least one generally elliptical slot formed in said cylindrical wall disposed with its minor axis parallel to said cylindrical wall longitudinal axis;
    said at least one inwardly extending boss and said at least one outwardly extending boss being longitudinally offset from one another by said generally elliptical slot minor axis;
    said outer diameter and said at least one outwardly extending boss being sized so that said sleeve can be inserted into said aperture, and said inner diameter and said at least one inwardly extending boss being sized so that said post can be inserted into said sleeve whereby said at least one outwardly extending boss engages said inner walls and said at least one inwardly extending boss engages said post.

11. The fastener of claim 10 wherein said at least one inwardly extending boss includes a plurality of inwardly extending bosses and said outwardly extending boss includes a plurality of outwardly extending bosses.

12. The fastener of claim 11 wherein each of said plurality of inwardly extending bosses is immediately adjacent to a respective one of said plurality of outwardly extending bosses.

13. The fastener of claim 12 wherein said plurality of inwardly extending bosses and said plurality of outwardly extending bosses is formed from half hemispheres.

14. The fastener of claim 13 wherein each of said plurality of inwardly extending bosses shares a geometric center with a respective one of said plurality of outwardly extending bosses.

\* \* \* \* \*